Dec. 11, 1956 E. FEIGL 2,773,987

FREQUENCY SELECTOR

Filed Dec. 12, 1952 8 Sheets-Sheet 1

INVENTOR.
ERICH FEIGL

BY Ostrolenk, Faber, Gerb & Soffen
ATTORNEYS

Dec. 11, 1956 E. FEIGL 2,773,987

FREQUENCY SELECTOR

Filed Dec. 12, 1952 8 Sheets-Sheet 2

INVENTOR.

ERICH FEIGL

BY Ostrolenk, Faber, Gerb & Soffen

ATTORNEYS

Dec. 11, 1956 E. FEIGL 2,773,987

FREQUENCY SELECTOR

Filed Dec. 12, 1952 8 Sheets-Sheet 3

INVENTOR.
ERICH FEIGL
BY Ostrolenk, Faber, Gerb & Soffen
ATTORNEYS

Dec. 11, 1956 E. FEIGL 2,773,987

FREQUENCY SELECTOR

Filed Dec. 12, 1952 8 Sheets-Sheet 4

INVENTOR.

ERICH FEIGL

BY Ostrolenk, Faber, Gerb & Soffen ATTORNEYS

INVENTOR.
ERICH FEIGL
BY Ostrolenk, Faber, Gerb & Soffen
ATTORNEYS

Dec. 11, 1956 E. FEIGL 2,773,987

FREQUENCY SELECTOR

Filed Dec. 12, 1952 8 Sheets-Sheet 6

INVENTOR.

BY ERICH FEIGL

Ostrolenk, Faber, Gerb & Soffen ATTORNEYS

INVENTOR.
ERICH FEIGL
BY Ostrolenk, Faber, Gerb & Soffen
ATTORNEYS

Dec. 11, 1956 E. FEIGL 2,773,987

FREQUENCY SELECTOR

Filed Dec. 12, 1952 8 Sheets-Sheet 8

INVENTOR.
ERICH FEIGL
BY Ostrolenk, Faber, Gerb & Soffen
ATTORNEYS

United States Patent Office 2,773,987 Patented Dec. 11, 1956

2,773,987

FREQUENCY SELECTOR

Erich Feigl, Los Angeles, Calif., assignor to Standard Coil Products Co., Inc., Los Angeles, Calif., a corporation of Illinois Application December 12, 1952, Serial No. 325,515

3 Claims. (Cl. 250—40)

The present invention relates to frequency selecting devices and more particularly to a frequency selector adapted to receive individual frequencies in a plurality of bands.

Frequency selectors such as those used commercially in the television industry and known as tuners were heretofore limited to the selection of twelve television channels in the V. H. F. band. Recently, however, the F. C. C. allocated seventy new channels in the U. H. F. band throughout the United States in addition to the previously existing twelve V. H. F. channels. The television industry was thus confronted with the problem of extending the range of the tuners from the original band from 54 to 216 megacycles to a new band from 470 to 890 megacycles so that a present-day television tuner must be capable of operation in the frequency band from 54 megacycles to 890 megacycles.

Up to the present time various types of channel selectors have been proposed: a continuous type, a switch type, a turret type and a type which involves continuous tuning in several bands.

The turret type channel selector is basically a switch type, the movable turret carrying tuning elements and contact members which are moved with respect to stator contacts, while the switch type unit has stationary tuning elements connected to a set of movable contacts.

The turret type of tuner (i. e. Patent No. 2,504,758) would, if used as a single turret for 82 channels, require either too large a turret or channel elements which are too small.

Proposals have, however, been made (application Serial No. 273,720 filed February 27, 1952) to extend the range by using two turrets wherein one turret will prepare the circuit for successive groups of channels and the other turret will select specific channels within each group.

The continuous type channel selector provides for selection of up to 82 television channels through movement of appropriate electrical elements and uses essentially one conversion to transform the incoming television signal to a new signal having as carrier the intermediate frequency of the television set which may be selected at any desired frequency dictated by the design from 41 to about 200 megacycles.

Continuous tuning as heretofore known is generally subject to several difficulties when a large number of channels are to be received.

1. Where a large number of settings are to be made, movement from one end to the other of the range of frequencies may require extended continuous manipulation.

2. The difficulty of maintaining accurate tracking of the oscillator circuits is greatly increased as the frequency span is increased.

3. Where coupled circuits are used, the difficulty of maintaining appropriate coupling is greatly increased as the frequency span is increased.

Basically the present invention utilizes a combination of a turret tuner for selecting a band of frequencies with continuous tuning within the relatively narrow band selected. In other words, the present invention utilizes continuous tuning only over a very narrow range of channels, for example ten channels. This continuous tuning in the present invention may be obtained either by varying the capacitance of appropriate tuning capacitors or the inductance of appropriate tuning inductors.

While other systems of discrete channel selection have been proposed, they have been more complicated and in the case where double conversion has been used it has been found difficult (although not impossible) to eliminate all of the spurious responses and interferences which are possible when two oscillators are combined in the same tuning unit.

The present U. H. F. system can be used in a double conversion system where the input to the second converter is of fixed frequency.

It is well-known in the art that production tolerances in the tracking of super-heterodyne receivers become more critical as the percentage of frequency span is increased. Tracking is important in order to obtain proper performance, namely, a large signal to noise ratio and the rejection of spurious signals.

Heretofore tuners covering the U. H. F. range by means of continuously variable capacitors or inductors have been required to maintain tracking within reasonable limits over this entire range in order that performance not be sacrificed. Maintaining such an accuracy of tracking in previous continuous tuners has proved to be a definite production problem.

In addition, capacitively tuned units have normally required individual knifing of the capacitor plates in order to maintain satisfactory tracking.

The main advantage of the present tuner is that it is possible to select discrete bands of the U. H. F. range and then tune only over that selected band in which the desired channels are located.

By this means it is possible to maintain tracking accurately enough to provide pre-set stop positions corresponding to individual channel frequencies for all the bands in which the U. H. F. range has been divided.

This is made possible by the fact that in the present invention separate stator plates of the tuning capacitors are used for tuning within each small band of channels. In addition, it is possible to individually adjust the oscillator frequency for each group of channels.

As a result of this, the effects of slight changes in wiring or lead length or slight changes in the capacitance or inductance of the tubes are greatly minimized as far as tracking accuracy is concerned.

In addition, the present tuner has the advantage that separate channel board structures can be manufactured and preadjusted to standard boards and when these boards are inserted in a turret assembly it is only necessary to adjust the center frequency on each board for each group of channels in order to maintain the correct discrete channel selection.

Furthermore, with the tuner of the present invention it is possible to use only two separate knobs and thus rapidly turn from a low frequency to a high frequency so that, for example, to go from channel 2 to channel 74 it is not necessary to turn through all the intermediate channels between 2 and 74.

An additional advantage of the present tuner is that fine tuning means may be easily incorporated since separate tuning elements are provided for each of the bands of the U. H. F. range with a single element for varying the reactance of the fine tuning elements.

It is thus possible to maintain the range of fine tuning also approximately constant for each set of channels in a particular frequency band.

The single conversion application of the present frequency selector provides a system whereby the U. H. F. oscillator is non-operative during V. H. F. reception and, conversely, the V. H. F. oscillator is non-operative during U. H. F. reception.

By these means spurious signals attributable to two oscillators operating simultaneously are eliminated from the output of the frequency selector.

In addition, the present tuner uses discrete selection and may be constructed to operate as a decade tuner. It is well-known in the art that a decade tuner is one in which the decimal system of notation is used. When applied particularly to television tuners it means that each position of one element of the tuner covers ten channels while the position of a second element of the tuner determines which single channel is selected out of the ten possible.

It is apparent that a discrete selection tuner may be operated also using other numeral systems such as, for example, a six or eight unit system.

One object of the present invention is, therefore, to provide a switch or turret type frequency selector having no spurious responses attributable to the simultaneous operation of two oscillators in the tuner.

Another object of the present invention is the provision of means whereby a predetermined tuning position can be provided for each channel of a television tuner.

A further object of the present invention is to provide a frequency selector having a decimal position system.

Considering first the U. H. F. section of this novel frequency selector, it will be seen that it consists essentially of a rotatable turret formed by a system of panels supported by end discs. In the present embodiment the seventy U. H. F. channels have been divided into eight bands where the first band includes all channels from 14 to 19, the second band includes channels 20 to 29, and so on, until the last band which includes channels 80 to 83. Each of the panels forming the turret predisposes the frequency selector for reception of one of these bands, in which the U. H. F. range was divided. The selection of any one of these bands is made possible by the engagement between the contacts of the panel corresponding to that band and a set of stationary contacts mounted on the chassis of the frequency selector. The U. H. F. turret is provided with a hollow shaft by means of which it is possible to rotate the turret and, therefore, select the desired band.

A concentric shaft is located in the interior of the turret and extends through the hollow shaft of the turret. This concentric shaft carries a set of dielectric plates having appropriate shape. These plates move with respect to sets of conductive plates mounted on the interior side of each of these panels. The conductive plates of one panel may generally be of different contour or have different spacing between plates from those mounted on the other panels.

More specifically, the spacing between the conductive plates or their contour is varied from one panel to the next to change the difference in capacitance between the extremes of rotation of the dielectric plate so that at different U. H. F. bands, that is, for different panels, the angular rotation of the dielectric plate for the selection of ten channels will be the same regardless of the band being selected or the band in which these ten channels are located.

To summarize the above, this novel U. H. F. turret is provided with tuning capacitors consisting of conductive stator plates mounted individually on each panel of the U. H. F. turret. Dielectric plates common to all the tuning capacitors of the U. H. F. panels permit the selection of any of the ten channels located in a particular frequency band.

In addition, the stator plates of the tuning capacitors are so spaced between each other and the contour is so selected that the same angular rotation of the dielectric plates will encompass the same number of channels regardless of the frequency band in which these channels are located.

In other words, with this novel turret when applied to television tuners it is possible to select a channel, for example channel 28, by first rotating the U. H. F. turret so that its panel corresponding to channels 20 to 29 is engaged by the stationary contact. The dielectric plates are then rotated to select channel 28.

If, now, by some means the dielectric plate is retained in this position, namely the position corresponding to digit 8, and the U. H. F. turret is rotated to its next position, that is, in the position for reception of channels 30 to 39, this novel frequency selector is now conditioned to receive channel 38, no other adjustments being required.

If, therefore, the shaft carrying the dielectric plates is provided with a positioning system so that if the decimal system is used it may rotate through ten predetermined positions, a discrete tuning system is obtained.

While in the present embodiment the fact that it is necessary to change the contour or the spacing between the conductive plates of the tuning capacitors becomes apparent when it is considered that as the turret is rotated for selection of frequencies in higher and higher frequency ranges there is a variation of capacitance which, if at the low frequency end were to produce the selection of ten channels, may produce at higher frequency ranges a selection of, for example, twenty channels.

It is also possible to change the minimum capacitance of the tuning capacitors by other means as, for example, by means of a trimmer capacitor and thus maintain the ten channel coverage on all bands with essentially the same plate contour and spacing.

Moreover, it is possible to provide tuning capacitors with stator plates having spacings not necessarily regular as long as they are predetermined. The capacitance of these variable capacitances can also be changed by movement of a conductive plate positioned between the plates of these capacitors. In fact, the introduction of a conductive plate between the plates of a capacitor changes the electrical field distribution and in particular its intensity, thus causing a corresponding change in the capacitance of the system.

In the present invention the difference in capacity between extremes of rotation of the dielectric plates is varied so that it is at a maximum when receiving television signals at the low end of the U. H. F. range and it is at a minimum when receiving signals in the upper portions of the U. H. F. range.

It is evident that such a turret may be used not only in connection with television tuners but in any piece of equipment or apparatus which must be tuned through a wide range of frequencies.

When used with such an apparatus the frequency range through which the apparatus is to be tuned may first be divided into a number of bands and then individually frequencies in these bands may be selected by rotation of the dielectric plates.

I provide in addition a grounding plate which serves as a second plate for two of these variable capacitors. The grounding plate of conductive material serves to provide by its particular shape the desired amount of coupling between these two capacitors since the two capacitors are located in the radio frequency selector portion of this novel tuner and are electrically coupled together.

Accordingly, another object of the present invention is the provision of a conductive member, the configuration of which varies the coupling between two circuits in the radio frequency selector of a television tuner.

It is necessary to point out that the above-described frequency selector comprises a series of reactive elements mounted in a supporting framework, namely, a turret in which a change of reactance of all these reactive elements is controlled from a common shaft while the elements themselves may be selectively engaged by stationary contacts mounted on the chassis supporting this turret. Through this engagement the reactive elements of the turret mounted on the panels are introduced in an electrical circuit wired on the chassis of the frequency selector.

By the use of the above-described means for selecting individual channels in a frequency band of the U. H. F. range it is possible to obtain, as previously described, switch or discrete tuning of a kind previously thought impossible. In fact, when predetermined positions were selected in previous continuous tuners, it was usually found that because of the small angular rotation required to select the individual channel the positioning means had to be constructed with great accuracy. In the present tuner, on the other hand, since a 300° rotation of the dielectric plates carrying shaft encompasses only ten channels, regardless of the frequency band in which the tuner is operating, it is possible to positively position the ten channels of any U. H. F. band.

Another object of the present invention is, therefore, the provision of means whereby a discrete frequency selector having a multiplicity of bands is obtained.

A further object of the present invention is the provision of means whereby the rotation of a single shaft changes the magnitudes of electrical quantities on a plurality of band selecting channels.

Another object of the present invention is the provision of a multi-band selector having positive positioning means.

This novel U. H. F. turret may be used also to control the operation of a V. H. F. turret when applied to television tuners. In the tuner described the shaft carrying the dielectric plates in the U. H. F. turret is also the shaft on which the V. H. F. turret is mounted, the V. H. F. turret being provided with twelve positions corresponding to channels 2 to 13.

In addition, a switch member is provided so that when the tuner is to select V. H. F. channels the U. H. F. oscillator and antenna are non-operative. Conversely, when the tuner is operated at U. H. F., the V. H. F. oscillator operates as an I. F. amplifier and the V. H. F. antenna is shorted.

By the provision of such a switch it is seen that at no time will the two oscillators operate simultaneously so that beat patterns due to spurious signals produced by the oscillators do not appear on the television screen.

Furthermore, it is possible to so position and shape the U. H. F. tuning capacitors and dielectric plates that out of the twelve positions of the V. H. F. turret ten may also be used for positioning the channel selecting shaft of the the U. H. F. turret.

Accordingly, another object of the present invention is the provision of means whereby in television tuners for reception of U. H. F. and V. H. F. the radio frequency amplifier and converter is converted into two intermediate frequency amplifiers for U. H. F. reception.

In addition, the present U. H. F. tuner may also be used as a converter to transform present day television sets which receive essentially only V. H. F. channels into television sets capable of reception of U. H. F. channels in addition to the V. H. F. ones.

Of course, the present U. H. F. tuner may be appropriately coupled with a V. H. F. tuner and used as a unit for tuning both V. H. F. and U. H. F. channels.

Thus, another object of the present invention is a U. H. F. selector which can be used either alone as a converter or in conjunction with a V. H. F. tuner as a V. H. F.–U. H. F. tuner.

When the U. H. F. turret is used in conjunction with the V. H. F. turret it will be seen that during V. H. F. reception the V. H. F. signal entering from the V. H. F.

antenna is first amplified by a radio frequency amplifier on the V. H. F. side of the tuner and then mixed in an electron tube with heterodyning signals from the local oscillator to produce any chosen intermediate frequency which may be 41 megacycles. When set for V. H. F. reception, the U. H. F. oscillator is non-operative, and the U. H. F. turret itself is stationary to a ninth position, the other eight positions corresponding to the eight bands of the U. H. F. range.

When the tuner is set for U. H. F. operation on the other hand, the U. H. F. signal is introduced on the U. H. F. side of the tuner and there, through mixing in a crystal mixer with signals from the local U. H. F. oscillator, it is changed into the selected intermediate frequency signal which may be 41 megacycles. This signal is now introduced on the V. H. F. side of the tuner which has now been appropriately changed and has become a two stage I. F. amplifier at the selected frequency. The change in the operation of the V. H. F. tuner from an actual tuner to a two stage I. F. amplifier is made possible by the above-mentioned switching member.

Accordingly, another object of the present invention is the provision of a U. H. F.–V. H. F. tuner in which V. H. F. and U. H. F. channels may be easily selected and are subjected to approximately the same amplification.

It was previously mentioned that a fine tuning element may be easily incorporated in the present U. H. F. tuner. This is accomplished by extending the stator plates of the tuning capacitors so that a portion of them will appear outwardly with respect to the turret.

An appropriately shaped dielectric or conductive plate is positioned within these extensions of the stator plates and is carried by another shaft rotatable in an appropriate opening of the chassis of the U. H. F. tuner. This shaft is operated by means of friction discs, one of which is rigidly secured to a cylindrical sleeve positioned concentrically and around the cylindrical sleeve of the U. H. F. turret.

The addition of this fine tuning means necessitates then a third knob. This means that the television set operator in order to tune his set when provided with the present U. H. F. tuner for reception of a particular channel must first select a desired channel by rotation of both the U. H. F. turret and the tuning capacitor shaft.

These two operations as above described permit the discrete selection of a channel if both the U. H. F. turret and the tuning capacitor shaft are provided with positioning means, the first for tens and the second for units.

After these two operations it is sometimes necessary to make another adjustment to obtain a better picture or better sound, that is, to fine tune.

This final operation is obtained by rotation of a third knob which through appropriate engagement causes the rotation of the fine tuning capacitor shaft to compensate for any possible shifts in the electrical components.

The fine tuning capacitor shaft is also provided with an additional dielectric plate when the U. H. F. turret is used in conjunction with the V. H. F. tuner. The additional dielectric plate in such case then serves to fine tune in the V. H. F. range in a manner well-known in the art.

In addition, in order to adjust electrical elements of the V. H. F. oscillator so that the oscillator may be adjusted to operate at exactly the frequency desired, one side of the U. H. F. turret may be provided with an opening in alignment with the switching panel hereinafter described through which the serviceman may adjust the frequency of the V. H. F. oscillator on each panel thereof.

A similar adjustment for the U. H. F. oscillator is made possible in the present tuner by the provision of a trimmer element which is to be adjusted for the center frequency of the frequency band corresponding to the particular U. H. F. panel board.

Accordingly, another object of the present invention is the provision of means whereby the oscillator frequency for both V. H. F. and U. H. F. reception can be easily adjusted from the front of the U. H. F.–V. H. F. tuner combination.

Still another object of the present invention is the provision of means whereby the oscillator frequency during both U. H. F. and V. H. F. reception may be easily adjusted from the front of the television receiver set.

A further object of the present invention is the provision of fine tuning means for both U. H. F. and V. H. F. reception.

Still another object of the present invention is the provision of a single fine tuning control for all channels, V. H. F. and U. H. F., from channel 2 to channel 83.

When in the present tuner electrical components do not meet the required specifications and thus one group of channels is found to be inoperative or to have a poor performance, it is only necessary to remove the channel board covering the defective channels and insert a new channel board covering this same group of channels.

Therefore, a further object of the present invention is a channel selector which is easily serviceable.

Another object of the present invention is the provision of a U. H. F.–V. H. F. tuner in which V. H. F. and U. H. F. channels may be easily selected and are subjected to approximately the same amplification.

A further object of the present invention is the provision of novel simplified means for operating the stator contacts between an engaging (or intercepting) and a non-operative position automatically in response to movement of the U. H. F. turret.

A further object of the present invention is the provision of means whereby the same positioning device is used to predetermine the positions of the V. H. F. channels and the positions of the U. H. F. channels located in any U. H. F. band.

Still another object of the present invention is the provision of means whereby a television tuner will have relatively great amplification regardless of whether it is operated at V. H. F. or at U. H. F.

Still another object of the present invention is the provision of means whereby a V. H. F. tuner is adaptable to an addition of a U. H. F. tuner.

The foregoing and many other objects of the present invention will become apparent when taken in connection with the accompanying drawings in which:

Figure 1 is a perspective view of the novel U. H. F.–V. H. F. tuner adjusted for V. H. F. reception.

Figure 2 is a perspective view of the tuner of Figure 1 adjusted for U. H. F. reception.

Figure 3 is an exploded view of the novel U. H. F. turret showing the arrangement of the stator plates of the tuning capacitor.

Figure 4 is the electrical circuit diagram of the novel tuner when set as in Figure 1 for V. H. F. reception.

Figure 5 is an electrical circuit diagram of the novel tuner when set as in Figure 2 for U. H. F. reception.

Figure 8:
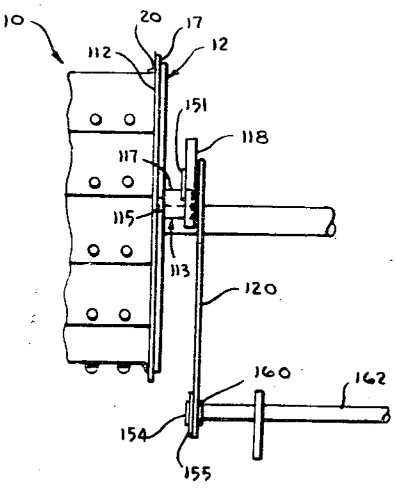

Figure 8 is a detailed view of the U. H. F.–V. H. F. switch operating mechanism of the novel frequency selector.

Figure 9:
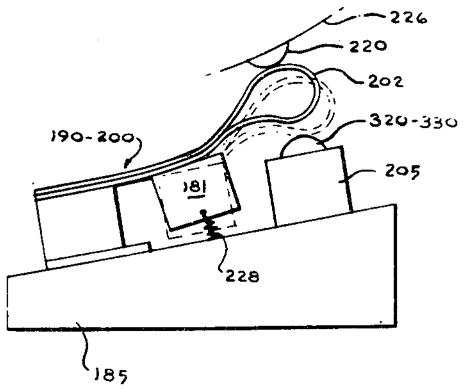

Figure 9 is a detailed view of the stationary contact assembly of the novel frequency selector.

Figure 10:
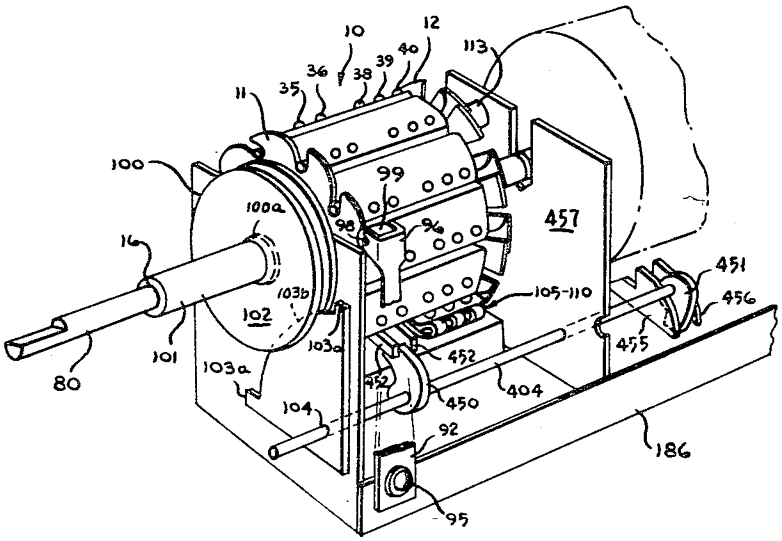

Figure 10 is a detailed view of the fine tuning mechanism for fine tuning in both the U. H. F. and V. H. F. range.

Figure 11:
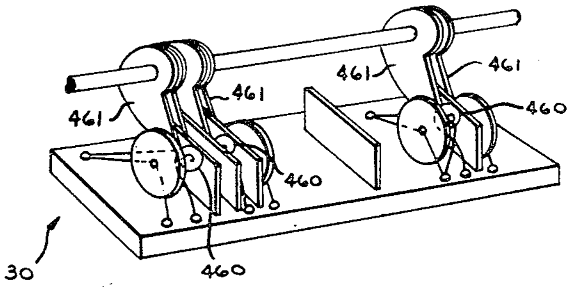

Figure 11 is a schematic view of a modification of the novel channel selecting elements.

Figure 12:
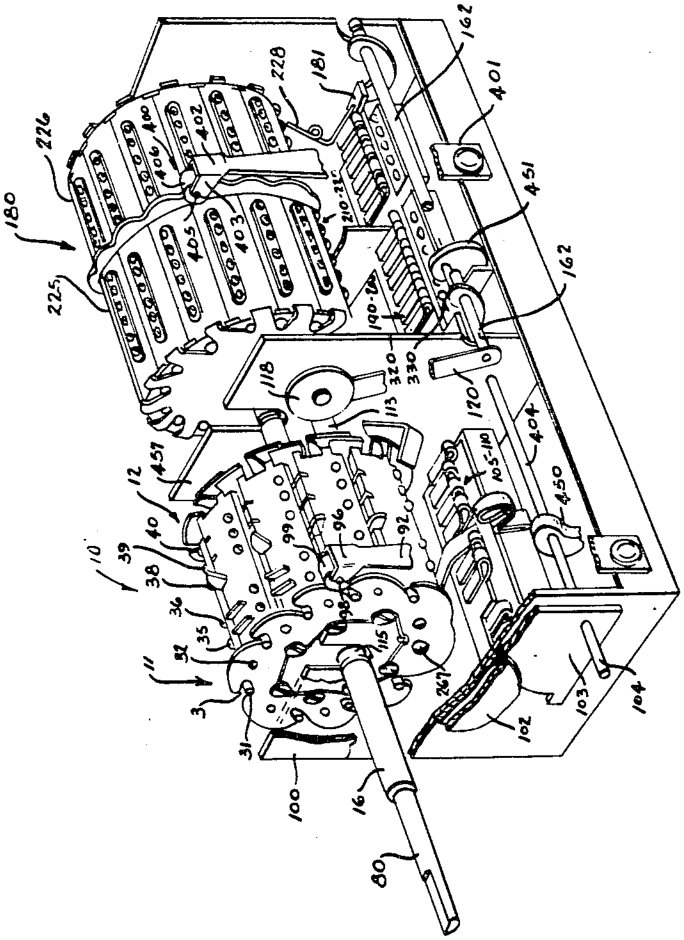

Figure 12 is an exploded view of the V. H. F.–U. H. F. tuner of the present invention.

Figure 1:
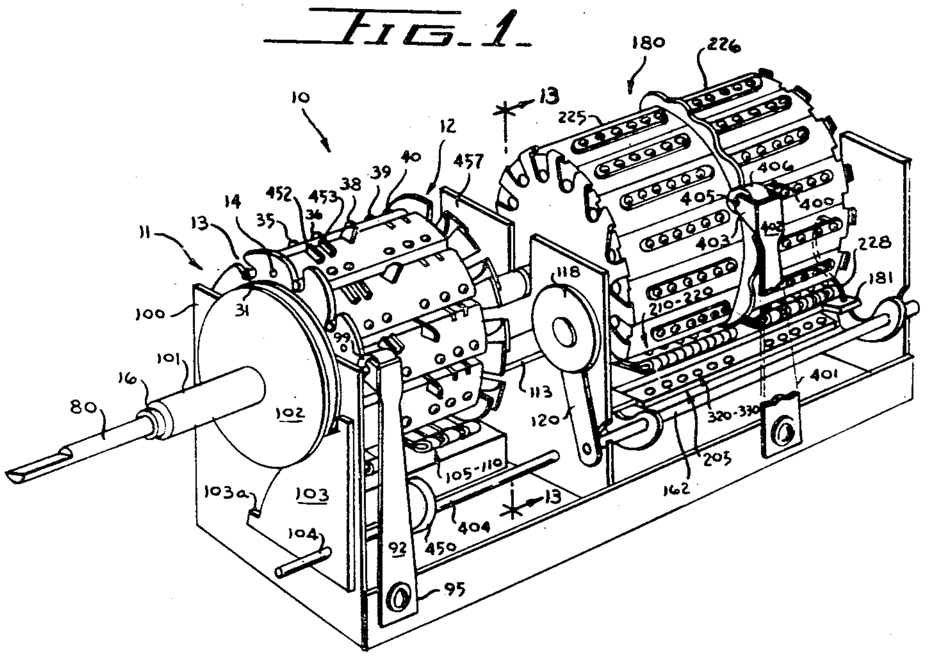
Figure 13:
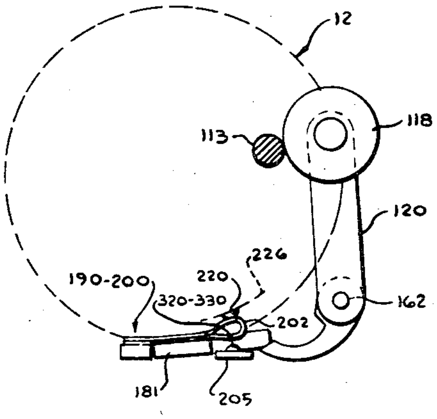

Figure 13 is a detailed view of the switch operating mechanism corresponding to the position of the turrets shown in Figure 1.

Figure 2:
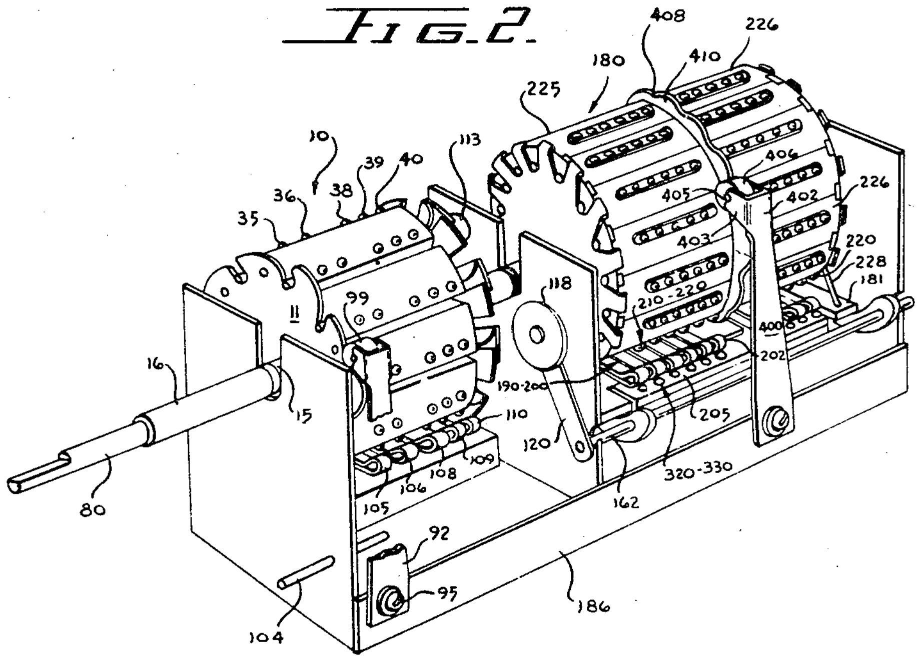
Figure 14:
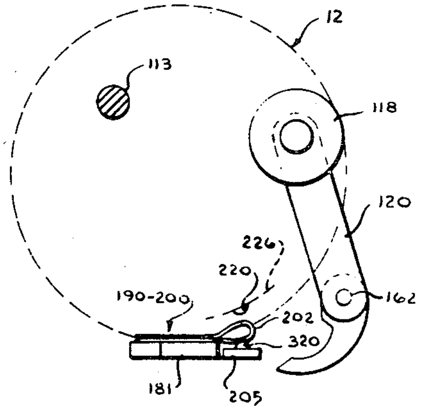

Figure 14 is a detailed view of the switch operating mechanism corresponding to the position of the turrets shown in Figure 2.

Figure 3:
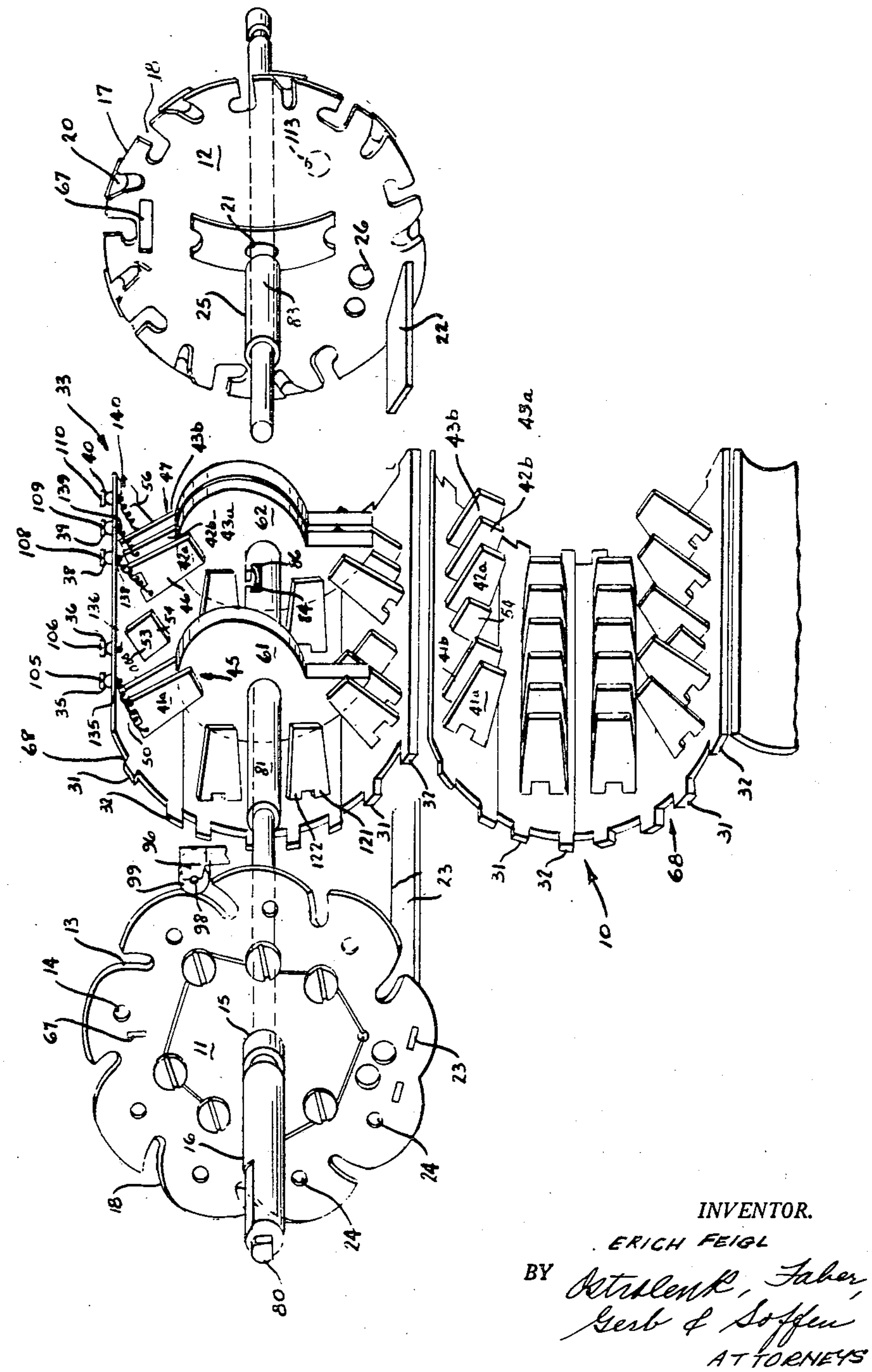

Referring first to Figure 3 showing the electro-mechanical features of this novel U. H. F. turret, the turret 10 is provided with two supporting discs 11 and 12. Supporting disc 11 has peripheral slots 13 and circular openings 14. Supporting disc 11 is also provided with a centrally located circular opening 15 which permits the mounting of a cylindrical sleeve 16 to supporting disc 11 so that rotation of cylindrical shaft or sleeve 16 will cause a similar rotation of disc 11.

Disc 12 (Figure 7) is provided with slots 17 and 18 where slots 17 have a circularly shaped bottom while slots 18 are shaped in the form of a shoe.

In addition, disc 12 is provided with approximately rectangular slots 22 in what corresponds to the position of a ninth panel of U. H. F. turret 10. Aligned with rectangular openings 22 on disc 12 are similarly shaped rectangular openings 23 on disc 11 so that as described hereinafter a metallic bar 66 for rigidly interconnecting discs 11 and 12 may be positioned in these openings 22 and 23 and thus avoid any possible angular shift between discs 12 and 11 on rotation of turret 10.

Disc 11 is also provided with a set of circular openings 24 corresponding to the position of each panel 30 for U. H. F. turret 10. Openings 24 are provided to permit adjustments in the oscillator tuning elements so that as is well-known in the art, the serviceman may prepare turret 10 for reception in a particular location.

In addition to these openings 24, disc 11 and now also disc 12 are provided with a circular opening 26 so positioned on discs 11 and 12 that a screw driver may be inserted in these openings 26 through turret 10 to permit the adjustment of the oscillator adjusting screws on the panel 226 of the V. H. F. turret 180 when the particular panel 226 is in engagement with the contact structure of V. H. F. turret 180.

Thus, openings 26 on discs 11 and 12 will have to be positioned so that when turret 10 is in its ninth position (V. H. F. reception) a screw driver may be inserted through turret 10 to control the frequency of oscillation of the oscillator described hereinafter of the V. H. F. turret 180.

In addition, disc 12 is provided with a series of resilient retaining fingers 19 having a bent portion 20 which, as will be explained hereinafter, serves to resiliently hold the panels forming turret 10. Disc 12 is also provided with a centrally positioned circular opening 21 which acts as a bearing for shaft 25 concentric to sleeve 16 and located interiorly with respect to sleeve 16.

Bridging the two discs 11 and 12 (Figure 3) are a set of panels 30, the number of panels being in this case 9. Each panel 30 is provided with extensions 31 and 32 on each end of the panel and the panels 30 are so shaped that when the correct number of them, in this embodiment 9, are mounted on the supporting discs 11 and 12 through engagement of extensions 31 and 32 with slots 13, 17 and 18 and opening 14, the cylindrical turret 10 is obtained.

On one surface of panel 30 are located the movable contacts 35, 36, 37, 38, 39 and 40 while on the other side of the panel 30 are mounted the pairs of stator conductor plates 41*a*–*b*, 42*a*–*b* and 43*a*–*b* which form the stationary members of the variable tuning capacitors 45, 46 and 47. It will be noted that in this particular embodiment of the present invention plates 42*b* and 43*a* actually form a single plate, hereinafter referred to as plate 42*b*—43*a*.

In addition to the pairs of stators 41, 42 and 43, each panel 30 also carries a set of electrical components. More specifically, each panel 30 is provided with a coil 50 connected between contact 35 and stator plate 41*a*. Similarly, stator plate 41*b* is connected to contact 36 through a coil 53. Contact 37 is connected to a shielding plate 54 positioned between coil 53 and coil 55 which is connected between contact 38 and stator plate 42*a*. Stator plate 42*b*—43*a* is connected directly to contact 39 while stator plate 43*b* is connected to contact 40 through a fourth coil 56.

While this novel turret was described as having mounted on each panel a set of inductive coils, any other desired electrical component, such as capacitors, may be mounted thereon.

It will be seen in Figure 3 that in order to arrive at tuning capacitors having decreasing differences in capacity between extremes of rotation of shaft 25 carrying the dielectric plates 61, 62 and 63, the separation between stator plates 41*a* and 41*b*, 42*a* and 42*b*—43*a* and 43*b* has been increased as the frequency of operation of the panels increases. In other words, by varying the separation of the conductive plates forming capacitances 45, 46 and 47 the difference in capacity between extremes of rotation of dielectric plates 61 to 63, from now on referred to as $\Delta C$ will be accordingly varied for each panel 30, the capacity becoming smaller and smaller as we go to higher frequency bands.

It will also be seen that there is only one dielectric plate, for example 61, for varying the capacitance of the eight capacitances 45 mounted on panels 30. The ninth panel 30, as will be described hereinafter, does not carry any electrical component and may be replaced by a solid tie bar.

Similarly, dielectric plates 62 and 63 simultaneously vary the capacitance of capacitors 46 and 47, respectively, of each panel 30 and it will also be seen that because of the fact that shaft 25 is freely rotatable in sleeve 16 it is possible to rotate turret 10 while keeping, by means of appropriate positioning devices or stops, the dielectric plate in a certain position. This means that if the U. H. F. range is divided into eight bands in which each of the eight bands excepting the first and the last comprises ten U. H. F. channels, when a certain U. H. F. channel is desired it is possible to first rotate shaft 25 so that it corresponds to a certain digit from zero to nine and by subsequently rotating turret 10 through sleeve 16 to select the decade number 1, together with the previously selected digit, will form the number designating the desired U. H. F. channel.

It will also be noted that since, as hereinafter described, the positioning device for the U. H. F. turret 10 cooperates with slots 13 in disc 11 of turret 10 to position turret 10 in the nine positions it has available, it is necessary to provide a rectangularly shaped bar 66 positioned at the unused or blank position of the U. H. F. tuner and a spacer bar 67 located on the opposite side with respect to the axis of the turret. Heavy bar 66 and spacer 67 positioned between discs 11 and 12 serve to make turret 10 a rigid member so that no torque will be transmitted from one disc 11 to the other disc 12 during rotation of turret 10. In other words, bars 66 and 67 between discs 11 and 12 are provided so that no angular displacement is produced between discs 11 and 12. Consequently, contacts 35 to 40 will always be aligned with respect to their corresponding stationary contacts as described hereinafter.

Shaft 25 which was previously mentioned as cylindrical is actually provided with a longitudinal flat portion 80 to permit precise angular mounting of dielectric plates 61, 62, and 63 on shaft 25 and to provide a means for applying a control knob (not shown) to operate dielectric plates 61, 62 and 63.

Furthermore, as will be seen hereinafter, flat portion 80 on shaft 25 serves to permit registration of dielectric plates 61, 62 and 63 with ten of the twelve positions of the V. H. F. turret when this novel frequency selector is used in a television tuner.

Dielectric plates 61, 62 and 63 are positioned with respect to each other and with respect to discs 11 and 12 by means of cylindrical spacers 81, 82, 83. Cylindrical spacer 81 serves to position the dielectric plate assembly 61, 62, 63 with respect to disc 11, and cylindrical spacer 83 serves to position the plate assembly 61, 62 and 63 with respect to disc 12. Finally, spacer 82 located between dielectric plate 61 and plate 62—63 serves to position the first plate 61 with respect to the second two, i. e., 62 and 63.

A dielectric disc 85 spaces correctly dielectric plate 63 from plate 62. The spacers 81, 82, 83 and 85 are rigidly secured to the plates 61, 62 and 63 to form a unitary assembly which may be easily held on shaft 25 and be properly positioned with respect to stationary plates 41, 42 and 43 of capacitors 45, 46 and 47 with no need for further adjustments.

Sleever 82 is provided with a cut-out 84 in which is positioned a flat spring member 86 so that through cooperation of spring member 86 with sleeve 82 and flat portion 80 of shaft 25, it is possible to retain the capacitor assembly 61—62—63 in the desired angular position on shaft 25.

It will be noted that shaft 25 can be moved longitudinally without in any way changing the relative position of the dielectric plates 61, 62 and 63 with respect to the stator plates 41, 42, 43 of tuning capacitors 45, 46 and 47.

Shaft 25 when this novel turret is used in conjunction with the V. H. F. tuner is the shaft operating the V. H. F. turret and, therefore, as previously mentioned will have twelve predetermined angular positions, ten of which are used for selecting the unit for each U. H. F. band.

Figure 6:
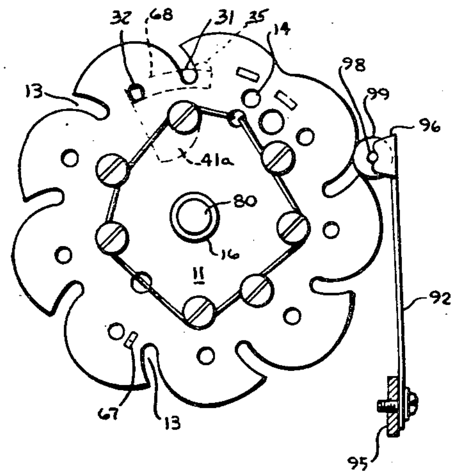
Figure 6 is a front view of the novel frequency selector showing the panel or coil board mounting means and the positioning or indexing device.
Figure 7:
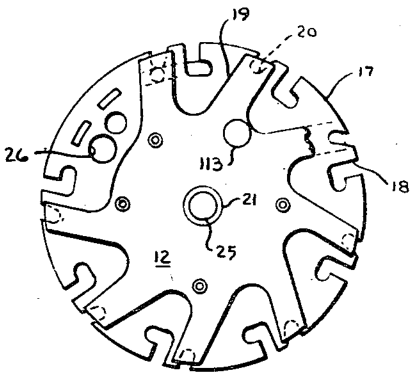
Figure 7 is the back view of the novel frequency selector showing the panel mounting means and the switch operating pin.

As for panels 30 forming turret 10, it will be seen that, referring to Figures 3, 6 and 7, they are formed by a dielectric base 33 on which are mounted the stator plates 41, 42 and 43 and the contacts 35—40. In addition, a shield 54 is soldered to contact 37 and by this means secures shield 54 to dielectric base 33.

It will be noted that contacts 35—40 while located exteriorly with respect to turret 10 are provided with extensions 135—140 interiorly with respect to turret 10 on which, as above described, are connected coils 50, 53, 55 and 56 in addition to stator plates 42*b* and 43*a* and shield 54.

The stator plates are provided with extensions 121 and 122 of which the longer one, namely 122, penetrates in the dielectric base 33 and is thus secured to it.

Panels 30 are mounted to form turret 10 through engagement of left-hand extensions 31 and 32 of panel 30 with slot 13 and opening 14, respectively, of disc 11 and of right-hand extensions 31 and 32 with slots 17 and 18, respectively, of disc 12.

More specifically, each panel 30 is mounted on discs 11 and 12 to form turret 30 by first introducing right-hand extension 32 of base 33 into opening 14 of disc 11; then sliding right-hand extension 32 of base 33 in slot 18 of disc 12.

Panel 30 is then rotated around the axis formed by right and left-hand extensions 32 until the left-hand extension 31 engages slot 13 of disc 11 and right-hand extension 31 engages slot 17 of disc 12.

Before right-hand extension 31 may enter slot 17, spring finger 19 is moved outwardly to permit entrance of extension 31 in slot 17. After entrance of extension 31 in slot 17, spring finger 19 is released so that its bent portion 20 releasably secures panel 30 on discs 11 and 12 against any radial movement. Tangential movement of panel 30 is avoided by accurately proportioning slots 13, 17 and 18 and opening 14.

Turret 30 thus formed is provided with positioning means 90 consisting of a spring arm 91 secured at 92 to chassis 95 of turret 10 and having a U-shaped portion 96 at its other end. U-shaped portion 96 is provided on each leg with a slot or recess 97 which acts as a bearing for a pin 98 carrying positioning roller 99.

The dimensions of roller 99 are such that it can engage the outer portion of slot 13, thus providing positive positioning means for turret 10. Positioning means 90 are mounted on chassis 95 so that every time roller 99 engages a slot 13 the contacts 35—40 on one panel 30 engage stationary contacts 105—110 mounted on chassis 95.

It will be noted that one of the nine panels 30 does not carry any stator plates or electrical component since its function is not to tune to a desired frequency but when used in a television tuner to operate a switch and introduce the V. H. F. in the electrical circuits of a television tuner as described hereinafter. Actually, the ninth panel is replaced by the previously mentioned bar 66 for making turret 10 a unitary and solid rotatable element.

In disc 12 is also a circular opening 112 in which is positioned a pin 113. Pin 113 has a smaller dimension section 115 engaging opening 112 (see Figures 7 and 8) of disc 12 and secured to it in any suitable way.

The largest diameter section 117 of pin 113 engages a roller 118 on lever 120, operating means of switch 125 in the ninth position of turret 10, that is, when the ninth panel 30 of turret 10 is facing the stationary contact assembly 105—110.

Roller 118 is mounted on lever 120 by means of a rivet 151 with which roller 118 can rotate, being keyed to it at 152. At the other end of lever 120 is a second pin 154 having two portions 155 and 156 of different diameter. Around portion 155 is a disc 157 while portion 156 engages an appropriate opening 158 in lever 120. To the end 160 of pin 154 is fixed in any suitable manner the control rod 162 for switch 125.

Rod 162 extends all the way through the longitudinal length of the V. H. F. turret 180 and is surrounded by a rectangularly shaped member 181 which also extends through the length of turret 180.

A similar angular member 182 is fixedly mounted on a bracket 185, approximately U-shaped, mounted on the lower portion of chassis 186 of V. H. F. turret 180.

To stationary member 182 are rigidly connected by riveting the stationary contacts 190—200. Contacts 190—200 are made of a resilient conductive material having very good characteristics in flexing so that there is practically no possibility of ever damaging or breaking any of the contacts 190—200 regardless of how many times as described hereinafter they will be moved from V. H. F. to U. H. F. position.

Contacts 120—200 are also riveted or secured in any suitable way to member 181 carried by rod 162 and are provided with a contacting portion 202 which permits contacts 190—200 to make electrical contact with a stationary assembly 205 and contacts 210—220 mounted on V. H. F. turret 180 depending on whether a U. H. F. channel or a V. H. F channel is being selected The contact structure of switch 125 may be seen more clearly in Figure 9 and in the two possible positions in Figures 1 and 2 and 13 and 14.

Referring first to Figures 1, 4, 9 and 13, it will be seen that when U. H. F. turret 10 is in its ninth position, that is, when bar 90 is facing the U. H. F. contact assembly 105—110, pin 113 or better extension 117 of pin 113 engages roller 118 of lever 120 in the position shown in Figures 1 and 13.

The action of pin 113 on roller 118 is to raise roller 118 and, therefore, lever 120, thus causing the contact assembly 190—200 of U. H. F. turret 180 to move and make electrical engagement between portion 202 of contacts 190—200 with the movable contacts 210—220 of panels 225 and 226 of V. H. F. turret 180.

It should be noted that member 181 is biased in the lower position as shown in Figure 1 by means of a spring 228 secured to member 181 and bracket 185. Therefore, when pin 113 engages roller 118 of lever 120, pin 113 moves roller 118 in the upward position against the bias of spring 228. In this position, as previously mentioned, contacts 190—200 engage contacts 210—220 of V. H. F. turret 180 while opening the circuit between contacts 190—200 and the stationary contact assembly 205.

In such a position of U. H. F. turret 10, therefore, the tuner consisting of turrets 10 and 180 is conditioned to receive V. H. F. signals since the U. H. F. turret is in its inoperative position. In fact, as can be seen more clearly in Figure 4, when the U. H. F. turret is in its ninth position the electrical circuits of the U. H. F. turret, which will be described hereinafter in connection with Figure 5, are non-operative while the electrical elements of the V. H. F. turret are all operative to convert the incoming V. H. F. signal into a 41 megacycle signal to be introduced in the utilization circuits of a television set.

Referring now to Figures 1, 2, 3, 10 and 12, the front wall 100 of U. H. F. chassis 95 is provided with a centrally located opening 100a through which can extend channel selecting shaft 25 and band selecting sleeve 16. As previously mentioned, sleeve 16 is positioned around shaft 25. Mounted concentrically with sleeve 16, shaft 25 and around shaft 25 is a second sleeve or fine tuning shaft 101. The fine tuning shaft 101 carries a set of spring discs 102 so shaped that they act as one member of the friction gear 102, 103 where member 103 is shaped approximately as a section of a circle and is provided with two stop members 103a.

Member 103 always has a portion 103b positioned between or sandwiched between the two spring discs 102. In addition, member 103 is pivoted by means of the fine tuning shaft 104 entering chassis 95 of U. H. F. turret 10 through an appropriate opening (not shown).

It is evident now that if the fine tuning shaft 101 is rotated in any direction this rotation will be transmitted through frictional engagement of disc 102 and member 103 to shaft 104 which as can be seen in the figures carries also one dielectric plate 450 for fine tuning the U. H. F. turret and a second dielectric plate 451 for fine tuning the V. H. F. channels.

More specifically, dielectric plate 450 is positioned between extensions 452 and 453 of the tuning capacitor plates 41a and 41b of tuning capacitors 45 for oscillator 351 of the U. H. F. tuner. By rotation of dielectric plate 450 in extensions 452 and 453 of tuning capacitor 45 of oscillator 351, it is possible to fine tune after having selected the desired U. H. F. channel in a manner described above.

Similarly, dielectric plate 451 moves with respect to the set of plates 455 and 456 positioned at the front end 457 of the V. H. F. chassis 186. The plates 455 and 456 constitute stationary plates of the fine tuning capacitor 311 for the oscillator 302 of the V. H. F. tuner.

Thus, rotation of shaft 104 caused by rotation of the fine tuning shaft 101 will produce a variation in the capacitance of the fine tuning capacitors 452—453 on the U. H. F. turret and 455—456 in the V. H. F. turret, namely, a variation in the capacitance 45 of U. H. F. oscillator 351 and capacitance 311 of V. H. F. oscillator 302. Therefore regardless of whether the present tuner is set for U. H. F. or V. H. F. reception, by rotation of shaft 101 it is possible to obtain the desired fine tuning after selecting a desired channel.

Figure 4:
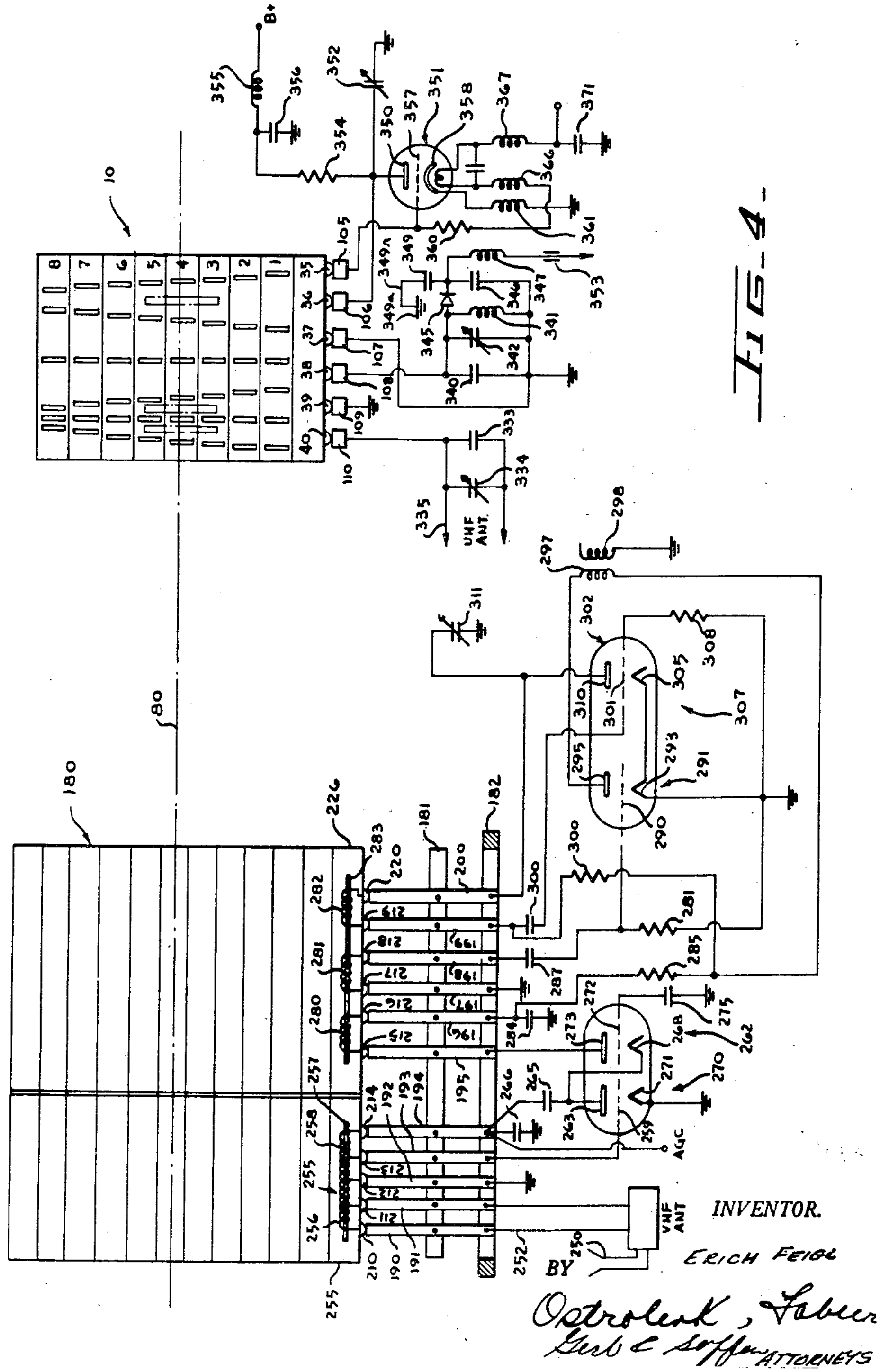
Figure 5:
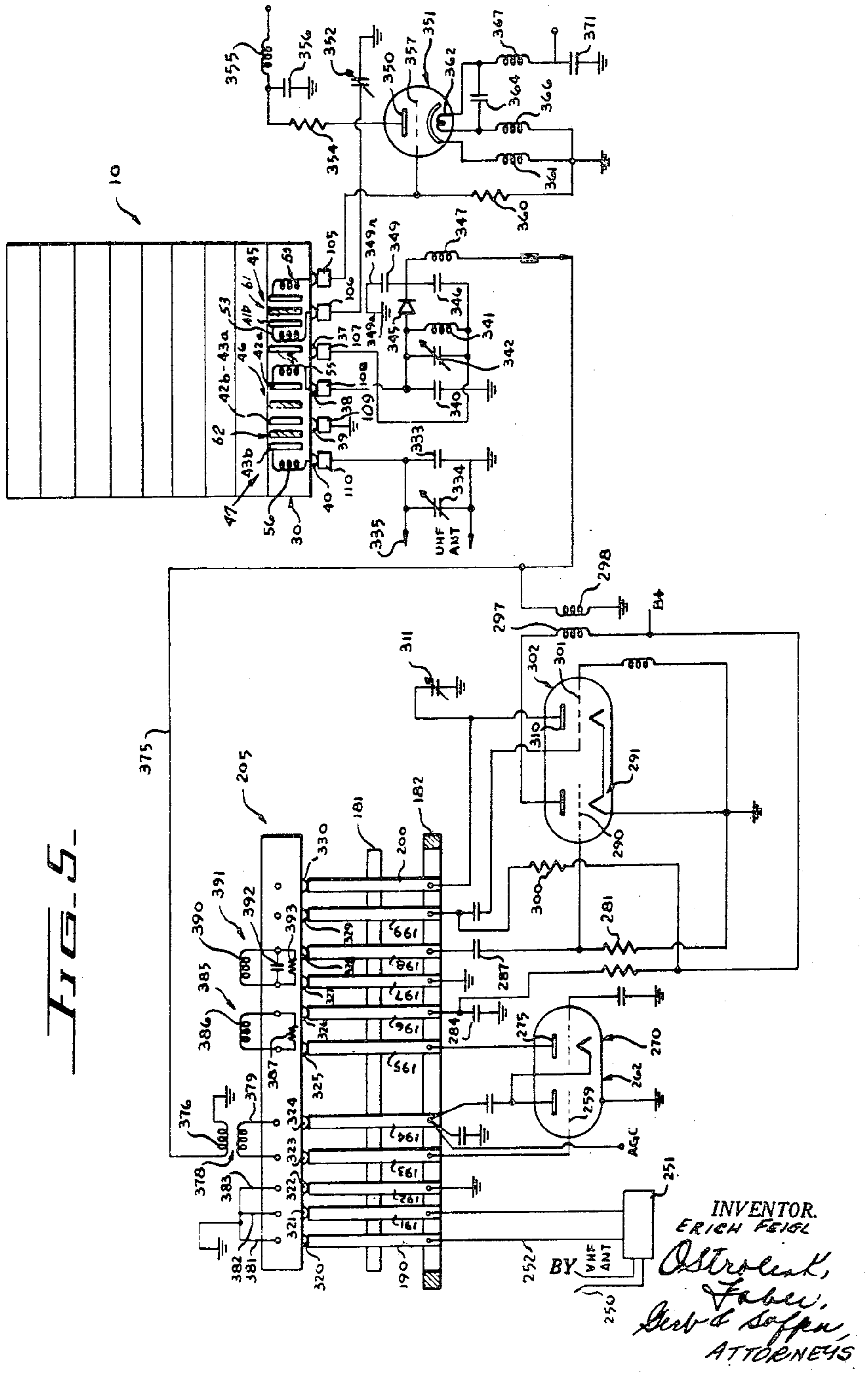

Referring now more specifically to Figure 4 which shows the resultant electrical circuits due to the particular position of switch 125 described in Figure 1, it will be noted that in this position the V. H. F. antenna 250 is connected through terminal board 251 and transmission line 252 to stationary contacts 190 and 191 and then to movable contacts 210, 211 of panel 225, also referred to as antenna segment 225, of V. H. F. turret 180. On each panel 225 is mounted, in a manner well-known in the art, a radio frequency transformer 255 consisting of a primary coil 256 wound on a coil form 257 and connected to the movable contacts 210 and 211. Also wound on coil form 257 is a secondary winding 258 of radio frequency transformer 255.

Secondary coil 258 is connected to movable contacts 213 and 214 and its center point is connected to contact 212. Contact 212 in this position of V. H. F. turret 180 is connected to switch contact 192 and thence to ground while contacts 213 and 214 across the secondary winding 258 of radio frequency transformer 255 are connected, respectively, to switch contacts 193 and 194 which in turn are connected to the grid 259 of grounded plate section 260 of cascode amplifier 262, while switch contact 194 is shown connected to the plate 263 of grounded cathode section 260 through a capacitance 265 to ground through a capacitance 266 and to a lead 267 to which the automatic gain control voltage may be applied in any known and suitable way.

Thus, V. H. F. signals received by the V. H. F. antenna 250 are applied to the input of cascode amplifier 262. Plate 263 of grounded cathode section 260 of cascode amplifier 262 is directly connected to the cathode 268 of the grounded grid section 270 of cascode amplifier 262. Cathode 271 of grounded cathode section 260 is connected directly to ground.

Grid 272 of section 270 is connected to ground through a capacitance 273 while plate 275 of section 270 is connected to switch contact 195 which in this position of the U. H. F. turret 10 engages movable contact 215 of V. H. F. panel 226.

On each panel 226 in this particular embodiment of the present invention are mounted three tuning coils 280, 281 and 282. All three coils 280, 281 and 282 are wound around a coil form 283 and coil 280 is connected to the movable contacts 215 and 216. Coil 281 is connected to the movable contacts 217 and 218 and finally coil 282 is connected to the movable contacts 219 and 220. In this position of U. H. F. turret 10 coil 280 is connected on one side directly to plate 275 of grounded grid section 270 of cascode amplifier 262 and on the other side to a dropping resistor 285 and thence to the positive power supply B+ common to all the electrical circuits of the V. H. F. tuner.

The second coil 281 is connected at one end to ground through engagement of movable contact 217 with switch contact 197. The other side of coil 281 is connected through engagement of movable contact 218 with switch contact 198 to a capacitor 287 and thence to a grid leak resistor 288. Grid 290 of converter section 291 is connected to the connecting point between capacitor 287 of the grid leak resistor 288. Cathode 293 of converter 291 is connected to ground, while plate 295 of converter 291 is connected to the primary coil 296 of the I. F. transformer 297 whose secondary coil 298 is connected to the utilization circuit of a television set (not shown).

Coil 282 is connected on one side to capacitance 300 through engagement of movable contact 219 with switch contact 199. Capacitance 300 is connected on the other side to grid 301 of oscillator tube 302.

Furthermore, switch contact 199 is connected to a resistance 304 and thence to the above-mentioned power supply B+. Cathode 305 of oscillator tube 302 is connected also to ground and since converter 291 and oscillator 302 are the half sections of a double triode tube 307, their cathodes 293 and 305 form actually a unitary structure energized by the same filament (not shown).

Grid 301 of oscillator 302 is connected to ground through grid leak resistor 308, while plate 310 of oscillator 302 is connected to switch contact 200 and thence through engagement with switch contact 200 with movable contact 220 to the other side of coil 282 mounted on panel 226.

To summarize the above, coil 280 is the tuning coil for the output of cascode amplifier 262; coil 281 is the tuning coil for the converter 291, and coil 282 is the tuning coil for the oscillator 302.

Thus, when the correct panels 225 and 226 are connected to the stationary circuit consisting of the above described elements, the desired channel will be received by the V. H. F. tuner and the corresponding intermediate frequency will appear across secondary coil 298 of I. F. transformer 297.

As previously pointed out, in this V. H. F. position spring 228 of switch 125 is tensioned by engagement of pin 113 and the roller 118 which cause switch contacts 190—200 to engage the turret contacts 210—220. In this position the V. H. F. signal received by the antenna 250 is first applied through transformer 255 to the input of cascode amplifier 262.

The properly amplified signal from cascode amplifier 262 is introduced by mutual coupling between output coil 280 and converter input coil 281 into the converter 291 at the same time that the proper oscillator signal is introduced through mutual coupling between coils 282 and 281 of the same converter 291 so that across the output coil 298 of I. F. transformer 297 appears the desired signal at the selected intermediate frequency of the television set.

It will be pointed out that member 182 on which contacts 190—200 are riveted is stationary and secured to the chassis 186 of V. H. F. turret 180 as previously described in connection with Figure 1, while member 181 is moved upwardly against the bias of spring 228. Since contacts 190—200 are also riveted on member 181, they will be banked in the portion between member 181 and 182 to engage the movable contacts 210—220 of turret 180.

Also as previously mentioned, the U. H. F. circuit shown in the right-hand side of Figure 4 in the example as thus far given is inoperative and will be described more in detail hereinafter in connection with Figures 2 and 5 and 14.

Referring, in fact, to Figures 2, 5, 9 and 14, pin 113 is now disengaged from roller 118 causing member 181 to return to its original position under the bias of spring 228. In other words, switch contacts 190—200 now engage the contacts mounted on the stationary contact assembly 205. Stationary contact assembly 205 is also mounted on bracket 185 which as previously described is fixed to chassis 186.

Stationary contact assembly 205 is provided with a set of contacts 320—330 which face switch contacts 190—200 when the U. H. F. turret is in any other position but the ninth. On stationary contact assembly 205 are mounted electrical components which transform the stationary circuit of the V. H. F. tuner into a two stage I. F. amplifier as may be seen in Figure 5.

Thus, when the U. H. F. turret is in any position from 1 to 8, the U. H. F. circuits shown in the right-hand side of Figure 5 are operative and convert the incoming U. H. F. channel to the intremediate frequency of the television set.

This intermediate frequency signal is then introduced into the stationary portion of the V. H. F. tuner and passed through two stages of I. F. amplification obtained through engagement of the stationary circuit of the V. H. F. tuner with the circuits mounted on the contact assembly 205 through engagement of switch contacts 190—200 with the stationary contact assembly contacts 320—330.

Referring now to Figure 5, the U. H. F. signal is received by U. H. F. antenna 331 and applied through a co-axial cable transmission line 332 across a fixed capacitance 333, one side of which is grounded and a variable or tripping capacitance 334 also grounded on one side.

The inner conductor of the co-axial cable 335 is connected to stationary contact 110 which is in turn connected to movable contact 40 of panel 30 of U. H. F. turret 10. To contact 40, as previously described, is connected an inductive coil 56 whose other side is connected to stator plate **43*b* of variable capacitor 47. The other stator plate 42*b*—43*a* is connected to movable contact 39 engaged by stationary contact 109 which is continuously connected to ground. Plate 42*b*—43*a* is also one of the stator plates for capacitance 46, the other plate 42*a* being connected to an inductance 55 having the other side connected to movable contact 38 engaged by stationary contact 108**.

Stationary contact 108 is connected to a circuit consisting of capacitance 340 and radio frequency choke 341 in parallel having their high side connected to stationary contact 108 and their low side connected to ground. Connected in parallel with capacitance 340 and choke 341 is a trimmer capacitor 342. Their high side is also connected to crystal mixer 345 which in its turn is connected to a capacitance 346 having its other side also connected to ground and coil 347 from which the intermediate frequency signal is tapped from the U. H. F. turret 10.

To contact point 348 common to crystal mixer 345, capacitor 346 and I. F. coil 347 is connected another grounded capacitance 349. Capacitance 349 is connected to ground through a conductor **349*a* shaped in the form of a loop so that loop 349*a* may serve as the injection device for injecting the signal from oscillator 351 into the crystal mixer 435**.

It will also be noted that capacitances 346 and 349 constitute a capacitance divider network so that the correct voltage amplitudes may be obtained from the U. H. F. turret 10. In addition, a capacitance 353 is connected between coil 347 and ground. The function of this capacitance 353 is to provide proper matching conditions between the I. F. tuning coil 347 and the input circuit of the intermediate frequency amplifier of the television set (not shown).

More specifically, fixed capacitance 333, inductance 56 and tuning capacitor 46 form a filter network having a low impedance to permit proper matching with the coaxial cable 332.

A second filter network is formed by tuning capacitor 46, inductance 55 and fixed capacitance 340, but this second filter network is at higher impedance for proper matching with the crystal mixer 345.

It will be noted that the two filters, namely 333—56—47 and 46—53—340 are coupled capacitively through the inherent coupling capacitance of the system consisting of the above-mentioned elements, but because of the particular values of the impedances of the two filter networks proper matching is always obtained.

Shield 54 mounted also on panel 30 is connected to movable contact member 37 and engaged by stationary contact member 107 which is continuously connected to ground, therefore, grounding shield 54.

The stator plate **41*b* of tuning capacitor 45 is connected to inductance 53 which is connected to movable contact 36 engaged by stationary contact 106. Stationary contact 106 is connected to the plate 350 of oscillator tube 351. Plate 350 of oscillator tube 351 is also connected to ground through a trimmer capacitor 352 of the B+ supply through a circuit consisting of dropping resistance 354, radio frequency choke 355 and by-pass capacitors 356 connected on one side of resistance 354 and choke 355** and on the other side to ground.

Stator plate **41*a* of tuning capacitor 45 is connected to an inductance 50 which in its turn is connected to movable contact 35 engaged by stationary contact 105. Stationary contact 105 is connected to the grid 357 of oscillator tube 351 and to the cathode 358 of tube 351 through a grid leak resistance 360. Cathode 358 of tube 351 is connected to ground through a radio frequency choke 361**.

Stator plate **42*b*—43*a* of capacitors 46 and 47 serves to couple the two capacitors and by appropriately shaping plate 42*b*—43*a* it is possible to obtain the required degree of coupling. In other words, the desired coupling in the above-described radio frequency filter circuit over the tuning range can be controlled by the shape of plate 42*b*—43*a***.

Filament 362 of tube 351 is shunted by capacitance 364 connected on each side to a radio frequency choke, namely 366 and 367. Choke 366 is connected to ground while choke 367 is connected to the filament supply shown schematically at 370 and to ground through a bypassing capacitor 371.

As shown more clearly in Figure 9, the stationary contact assembly 205 consisting of a bracket shaped member on which are mounted electrical contacts 322—330 and on the other side the electrical components such as I. F. coils 378. Contacts 320, 321, 322 of V. H. F. contact assembly 205 are all connected together by means of conductors 381, 382 and 383 which in their turn are grounded.

By this means the V. H. F. antenna 250 which is continuously connected to the switch contacts 190 and 191 is shorted and grounded through engagement of switch contacts 190 and 191 with the V. H. F. stationary contact assembly contacts 320 and 321, respectively.

In addition, switch contact 192 which as previously mentioned was already connected to ground now also engages contact 323 which as described earlier was connected to contacts 320 and 321 and also to ground.

Thus, switch contact 192 acts as a shield in case the already shorted and grounded V. H. F. antenna 250 should produce signals that might cause interference with the other circuits mounted on the V. H. F. contact assembly 205.

When in the U. H. F. position such as shown in Figure 5, the secondary winding 379 of I. F. transformer 378 is connected on one side to contact 323 of assembly 205 and is engaged by switch contact member 193 which, as previously described, is connected to the grid 259 of cascode amplifier 262.

The signal now applied to grid 259 is at the selected intermediate frequency. Thus, I. F. transformer 278 must be designed for one selected intermediate frequency.

Cascode amplifier 262 is provided with the same element as described in connection with Figure 4 and will amplify the signal applied at grid 259. The amplified signal appears in the output circuit of cascode amplifier 262, namely, the tuned circuit 385 consisting of inductance 386 shunted by resistance 387. Circuit 385 is connected between contacts 325 and 326 of assembly 205 which are engaged, respectively, in this position by switch contacts 105 and 196.

As previously mentioned, switch contact 195 is connected to the plate 275 of the grounded grid section 270 of cascode amplifier 262 while switch contact 196 is connected to ground through a capacitance 284 and to the B+ supply through dropping resistor 285. Inductance 386 is mutually coupled to inductance 390 of a second tuned circuit 391. Inductance 390 is shunted by a capacitance 392 and a resistance 393 and is connected between contacts 327 and 328 of assembly 205 which are engaged by switch contacts 197 and 198, of which 197 is grounded and 198 is connected through coupling capacitor 387 to the grid 290 of tube 291.

Tube 291 which during V. H. F. reception acted as a converter is now transformed because of the particular electrical circuit to which it is connected into a second stage of I. F. amplification. This may be easily seen from the circuit of Figure 5 since now the oscillator tube 302 is inoperative since no tuning circuits are connected between grid 301 and plate 310 of oscillator tube 302 and furthermore since plate 310 is not connected in any way to the positive supply B+.

Since oscillator tube 302 is not in operation, converter tube 391 acts as an amplifier and across secondary winding 298 of output I. F. transformer 297 appears an amplified intermediate frequency signal carrying all the intelligence obtained from the U. H. F. signal received by antenna 331.

All the elements in Figure 5 that were described in Figure 4 are denoted by the same numerals.

While this novel frequency selector was described in one of its applications, namely in a television tuner, it may be used whenever multi-band tuning is desired. In particular, the V. H. F. turret 180 and its associated circuits while described in a combination V. H. F.—U. H. F. tuner may also be used independently as a V. H. F. tuner with an auxiliary U. H. F. converter not mechanically coupled to the V. H. F. shaft 25.

In such a case the V. H. F. turret 180 instead of being provided with twelve positions will be provided with thirteen positions where the thirteenth panel is a blank board. In addition, turret 180 may be provided with a pin similar to the one described in connection with Figures 6 and 7 which may actuate switch 125 when the tuner is switched to its thirteenh position, that is, when the U. H. F. converter is introduced into the television set.

Returning now to Figures 2 and 10, it will be noted that shaft 25 is also the shaft which carries the V. H. F. turret 180. V. H. F. turret 180 is provided also with a positioning mechanism 400 similar to the one used in the U. H. F. turret shown in Figure 3.

Positioning device 400 consists of a spring finger 401 having at one end a U-shaped extension 402. The U-shaped extension 402 has two slots 403 which act as bearings for a pin 405 carrying a roller 406. Roller 406 is appropriately dimensioned to engage notches 408 of the scalloped disc 410 of V. H. F. turret 180.

The other side of spring member 401 is connected to the chassis 186 of the V. H. F. turret 180. This positioning means is of the type disclosed in Patent No. 2,496,183 to Thias et al.

In the present embodiment there are twelve notches 408 corresponding to the twelve V. H. F. channels through which it is possible to rotate the V. H. F. turret 180. V. H. F. turret 180 and the panels 225 and 226 are of the kind described also in the abovementioned patent, while the stationary circuits of the V. H. F. tuner are generally shown in application Serial No. 273,720 filed February 27, 1952.

Since shaft 25 is also the shaft carrying dielectric plates 61, 62 and 63, it is obvious that also these plates will have twelve positions, all preselected, of which only ten are used. In the present embodiment, the first ten positions are used, namely, those corresponding to V. H. F. channels 2 to 11, inclusive, which then correspond to digits 0–9 when operating in the U. H. F. band.

The alignment between scalloped disc 410 and the desired positions of dielectric plates 61, 62 and 63 is made possible as previously mentioned through engagement of the flat portion 80 by the positioning spring 86 in middle sleeve 82 of U. H. F. turret 10.

While capacitor tuning means 45, 46, and 47 for the U. H. F. turret 10 were described above, it is easily seen that such tuning means can also be variable inductances.

When inductances are used as tuning means, then the U. H. F. channel selecting operation although consisting of the same two steps; first, the rotation of the turret 10 for selection of the desired U. H. F. band and, second, rotation of tuning shaft 25 for selection of the desired channel in the preselected U. H. F. band, the electrical elements that are now varied will be different from the previous case as described in connection with Figures 1, 2, and 3.

Referring now to Figure 11 showing a modification of the channel selecting means, on each U. H. F. panel 30 are mounted coils 460 standing in planes perpendicular to the plane of panel 30.

The three tuning elements used in the particular illustrative embodiment shown make it desirable to use three coils 460 mounted on panel 30. It will be obvious that the number of tuning elements may be varied without departing from the spirit of the invention. The inductance of coils 460 is varied by movement of conductive plates 461 carried on shaft 25. Plates 461, two in number, are positioned on each side of each coil 460 and are properly shaped so that their motion with respect to coil 460 will produce a variation in the electromagnetic field around coil 460 and thus a variation in the inductance of coil 460.

Such a panel 30 with coils 460 may be used instead of the previously mentioned panels 30 carrying capacitors 45, 46, and 47.

Dielectric plates 61, 62 and 63 can be replaced by appropriately shaped metallic plates which determine by their position relative to the stator plates such as **41*a* and 41*b* the capacitance of, in the present example, capacitor 45**.

In the foregoing the invention has been described solely in connection with specific illustrative embodiments thereof. Since many variations and modifications of the invention will now be obvious to those skilled in the art, it is preferred to be bound not by the specific disclosures herein contained but only by the appended claims.

I claim:

1. A frequency selector adapted to receive individual frequencies in a plurality of U. H. F. bands comprising a stationary electric circuit and a rotatable turret, a plurality of contact elements connected to said electrical circuit, said stationary electric circuit comprising an input filter, said turret comprising a plurality of panels, tuning elements mounted on said panels, said tuning elements comprising variable capacitors, the plates of said capacitors being mounted on said panels, one of said plates being common to two of the said capacitors for the said filter, said capacitors being coupled to each other through said plate, the configuration of said plate determining the amount of coupling over the tuning range of said capacitors and thereby of said filter, a concentric shaft, dielectric plates mounted on said shaft and rotatable with said shaft, said dielectric plates being always positioned between said plates of said variable capacitors during rotation of said shaft, contact means connected to said tuning elements and mounted on each of said panels for selectively engaging said plurality of contact elements and predisposing said tuner to receive one of said bands at rotation of said turret, said dielectric plates through rotation of said shaft simultaneously varying said panel mounted variable capacitors and tuning said frequency selector for reception of one of said frequencies in the said one of said bands.

2. A frequency selector adapted to receive individual frequencies in a plurality of U. H. F. bands comprising a stationary electric circuit and a rotatable turret, said stationary electric circuit comprising radio frequency selecting and mixing elements including a filter, a plurality of contact elements connected to said electrical circuit said radio frequency elements including an input, said turret comprising a plurality of panels, tuning elements mounted on said panels, said tuning elements comprising variable capacitors, the plates of said capacitors being mounted on said panels, two of said capacitors forming the tuning elements for the said filter in the said radio frequency selector, a grounded conductive coupling member common to the said two capacitors for the said filter, the shape of said coupling member determining the degree of coupling between the said two capacitors over the tuning range of said capacitors and thereby said filter, a concentric shaft, dielectric plates mounted on said shaft and rotatable with said shaft, said dielectric plates being always positioned between said plates of said variable capacitors during rotation of said shaft, contact means connected to said tuning elements and mounted on each of said panels for selectively engaging said plurality of contact elements and predisposing said tuner to receive one of said bands at rotation of said turret, said dielectric plates through rotation of said shaft simultaneously varying said panel mounted variable capacitors and tuning said frequency selector for reception of one of said frequencies in the said one of said bands.

3. A television tuner adapted to receive individual channels in a plurality of V. H. F. and U. H. F. bands comprising a stationary electric circuit and a rotatable turret, said stationary electric circuit comprising radio frequency selecting and mixing elements including a filter, a plurality of contact elements connected to said electrical circuit, said radio frequency elements including an input, said turret comprising a plurality of panels, tuning elements mounted on said panels, said tuning elements comprising variable capacitors, the plates of said capacitors being mounted on said panels, two of said capacitors forming the tuning elements for the said filter in the said television tuner, a grounded conductive coupling member common to the said two capacitors for the said filter, the shape of said coupling member determining the degree of coupling between the said two capacitors over the tuning range of said capacitors and thereby said filter, a concentric shaft, dielectric plates mounted on said shaft and rotatable with said shaft, said dielectric plates being always positioned between said plates of said variable capacitors during rotation of said shaft, contact means connected to said tuning elements and mounted on each of said panels for selectively engaging said plurality of contact elements and predisposing said tuner to receive one of said bands at rotation of said turret, said dielectric plates through rotation of said shaft simultaneously varying said panel mounted variable capacitors and tuning said television tuner for reception of one of said frequencies in the said one of said bands.

References Cited in the file of this patent

UNITED STATES PATENTS

| | | |
|---|---|---|
| 2,385,131 | Garthwaite | Sept. 18, 1945 |
| 2,557,969 | Isely | June 26, 1951 |
| 2,600,119 | Lazzery | June 10, 1952 |
| 2,643,361 | Mackey | June 23, 1953 |